United States Patent
DiFalco et al.

(10) Patent No.: US 7,360,099 B2
(45) Date of Patent: Apr. 15, 2008

(54) COMPUTING ENVIRONMENT AND APPARATUSES WITH INTEGRITY BASED FAIL OVER

(75) Inventors: Robert A. DiFalco, Portland, OR (US); Thomas E. Good, Portland, OR (US); Gene Ho Kim, Portland, OR (US)

(73) Assignee: Tripwire, Inc., Portland, OR (US)

(*) Notice: Subject to any disclaimer, the term of this patent is extended or adjusted under 35 U.S.C. 154(b) by 832 days.

(21) Appl. No.: 10/251,545

(22) Filed: Sep. 19, 2002

(65) Prior Publication Data

US 2004/0059930 A1    Mar. 25, 2004

(51) Int. Cl.
G06F 11/30  (2006.01)
G06F 11/00  (2006.01)

(52) U.S. Cl. .......................................... 713/194; 726/24
(58) Field of Classification Search ...................... None
See application file for complete search history.

(56) References Cited

U.S. PATENT DOCUMENTS

| | | | |
|---|---|---|---|
| 6,014,746 A | 1/2000 | Krehnke et al. | |
| 6,073,251 A * | 6/2000 | Jewett et al. | 714/7 |
| 6,128,750 A | 10/2000 | Espy et al. | |
| 6,202,149 B1 * | 3/2001 | Hedegard | 713/100 |
| 6,446,200 B1 | 9/2002 | Ball et al. | |
| 6,496,951 B1 | 12/2002 | Tuccio | |
| 6,990,591 B1 * | 1/2006 | Pearson | 726/22 |

\* cited by examiner

*Primary Examiner*—Gilberto Barron, Jr.
*Assistant Examiner*—Laurel Lashley
(74) *Attorney, Agent, or Firm*—Schwabe Williamson & Wyatt

(57) ABSTRACT

Computing units of a computing environment are equipped with means to determine their respective integrity. Further, each computing unit is equipped, such that if its integrity is determined to have been compromised, the computing unit automatically takes itself out of service. In one embodiment, prior to the automatically removing itself from service, a degree of compromise is determined. If the degree of compromise is determined to be within an acceptable risk level, the compromised computing unit fails itself over to one or more other computing units in the computing environment.

26 Claims, 6 Drawing Sheets

COMPUTING ENVIRONMENT AND APPARATUSES WITH INTEGRITY BASED FAIL OVER

FIELD OF THE INVENTION

The present invention relates to the field of computing. More specifically, the present invention is related to trusted computing.

BACKGROUND OF THE INVENTION

With the proliferation of networked devices such as computers, digital assistants, wireless phones and so forth, and the ubiquitous access afforded to these devices by local, regional and wide area networks, such as the Internet, even the most protected executables and data can be vulnerable to harm. Whether the harm is due to damage caused by a virus, an unauthorized access, or simply due to natural occurrences such as exposure to the elements, the importance of executable and data integrity and security cannot be overstated.

FIG. 1 illustrates an example modern networked computing environment, comprising a "farm" 102 of application servers (AS) 104 serving a number of remote client computing devices 112 (hereinafter, simply clients). AS 104 are coupled to local area network (LAN) 108, which in turn is coupled to inter-network 110, through gateway 106. Some clients 112 are coupled to inter-network 110 directly, while others are coupled through their respective LAN 114. AS 104 may be an enterprise server, a Web Server and so forth, whereas clients 112 may be a desktop, laptop or palm sized computing devices, a personal digital assistants (PDA), or a wireless mobile phone (commonly referred to as "cell phones").

Examples of LAN include but are not limited to Token Ring, Ethernet, phone/power line based "home" networking, as well as various types of wireless networking. Examples of wide area networks include but are not limited to SONET networks, ATM networks, Frame Relays, and the like. Of particular notoriety is the TCP/IP based global inter-networks, Internet.

Gateway 106 typically includes some kind of "firewalls" to protect AS 104 from unauthorized or malicious accesses. For certain applications, gateway 106 may also include virtual private network (VPN) supports, i.e. requiring accesses by some or all of clients 112 to be through VPN connections, again to protect AS 104 from unauthorized or malicious accesses.

Each AS 104 typically includes a session manager 128 to manage user (i.e. client) sessions. The user/client sessions may be allocated and implemented in any one of a number of known manners, including but not limited to a master/slave, or a peer-to-peer relationship among the AS 104.

Additionally, each AS 104 typically includes some kind of virus detection and monitoring software to prevent AS 104 from being infected with destructive viruses. Further, depending on the application services being offered, some or all of the applications or application services 122 hosted (including the operating system 126) may employ one or more "tamper resistant" techniques, to prevent the application/operating system software and/or data from being compromised. These "tamper resistant" techniques include but are not limited to authentication, anti-modification as well as anti-observation techniques.

Recently, companies such as Tripwire, Inc. of Portland, Oreg., also offer monitoring software to assist Information Technology (IT)/network administrators in efficiently monitor the state of the various computing units of computing environments.

However, typically under the prior art, beside logging and/or notifications, i.e. alerts, of potentially harmful "intrusive" events, virus disinfecting and so forth, few if any automated services are available to enable a computing environment to quickly and automatically respond to integrity compromising situations, with little or no administrator intervention.

Thus, an improvement in this aspect of securing a computing environment is desired.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a method and apparatus for facilitating interaction between software entities, through the employment of an abstraction interface of a control type.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| MD5 | Message Digest |
| SHA-1 | Secure HASH Algorithm |

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
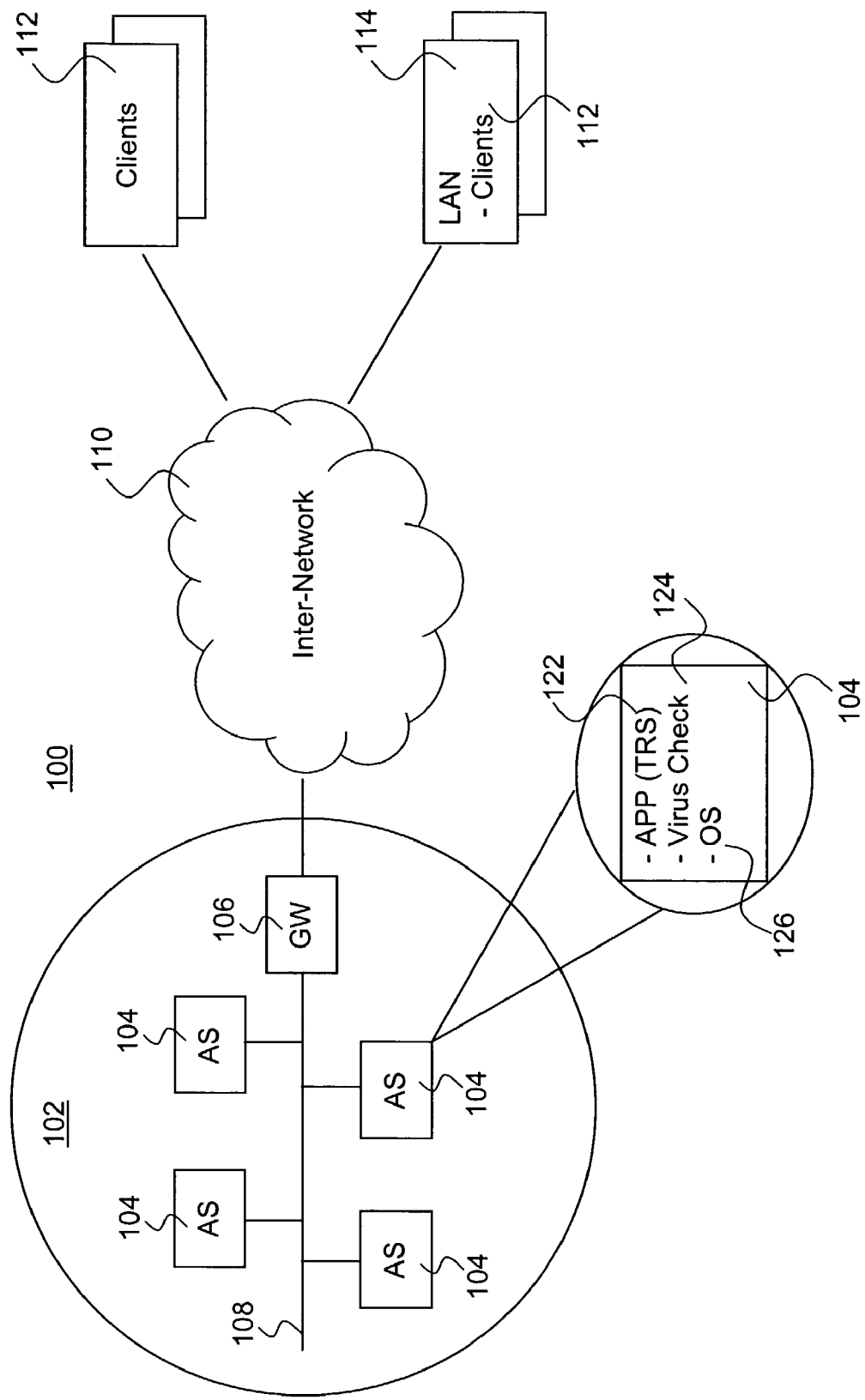
FIG. 1 illustrates an example computing environment of the prior art.
Figure 2:
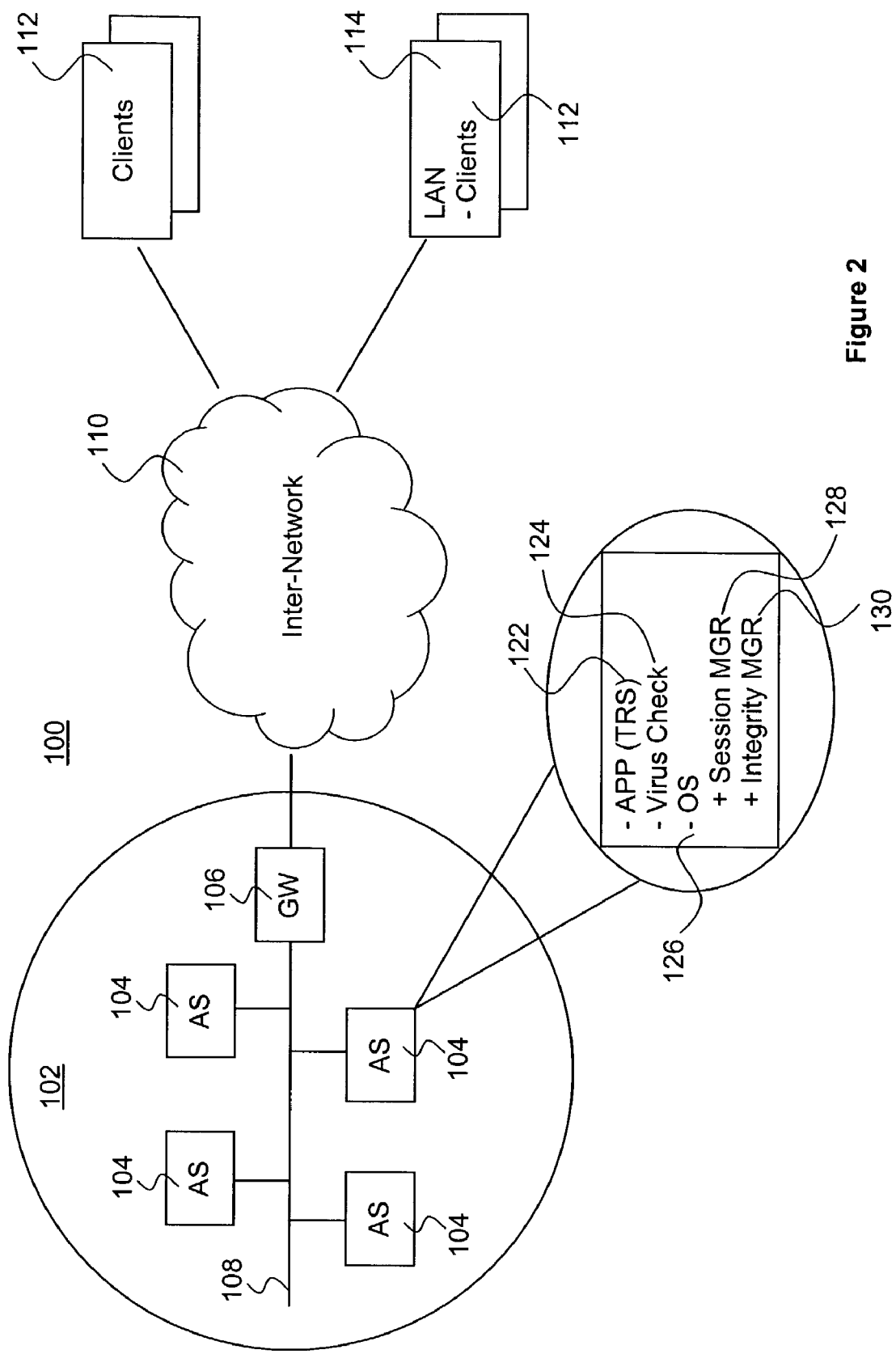
FIG. 2 illustrates another example computing environment, incorporated with the teachings of the present invention.

FIG. 2 illustrates an overview of the present invention, in accordance with one embodiment, in the context of the example computing environment of FIG. 1 enhanced with the teachings of the present invention. As illustrated, each of at least selected ones of AS 104 (preferably all) is provided with integrity manager 130 of the present invention.

Briefly, integrity manager 130 is equipped to periodically (or continuously, in some embodiments) to monitor the integrity of the "host" AS 104, and automatically causes the AS 104 to be "immediately" taken out of service, thereby ensuring all client sessions are hosted in a known and uncompromised environment.

Further, integrity manager 130 is equipped to determine a degree of compromise, and if the determined degree of compromise is deemed to be within an acceptable risk level, integrity manager 130 causes the "host" AS 104 to fail over to one or more of the remaining AS 104, thereby allowing the execution integrity to be advantageously achieved in a substantially transparent manner to clients 112.

The "host" AS 104 refers to the AS 104 on which integrity manager 130 executes at least in part, to verify the integrity of its "relevant" components. Typically, integrity manager 130 executes in whole in the "host" AS 104. However, the present invention contemplates that, in alternate embodiments, portions of the verification process, e.g. part of the computation of a signature, may be performed on another companion/supporting computing device.

The term "immediacy" as used in the present application refers to the general notion or desire of achieving the end objective, i.e. the removal of the "compromised" AS 104 from service without undue delay. It is not to be construed as requiring zero or virtually zero delays.

Typically, what constitutes "compromised" is component dependent. For example, for an executable, it may be the signature of the executable no longer matching a known "good" signature, whereas for certain critical system data, it may be the current value not matching a known "good" value or within a range of known "good" values.

What constitutes "goodness" may be application dependent, i.e., varies from one application of the present invention to another. Similarly, what constitutes "a degree of compromise that is within an acceptable risk level" may also be application dependent.

Data and Function Organization

Figure 3:
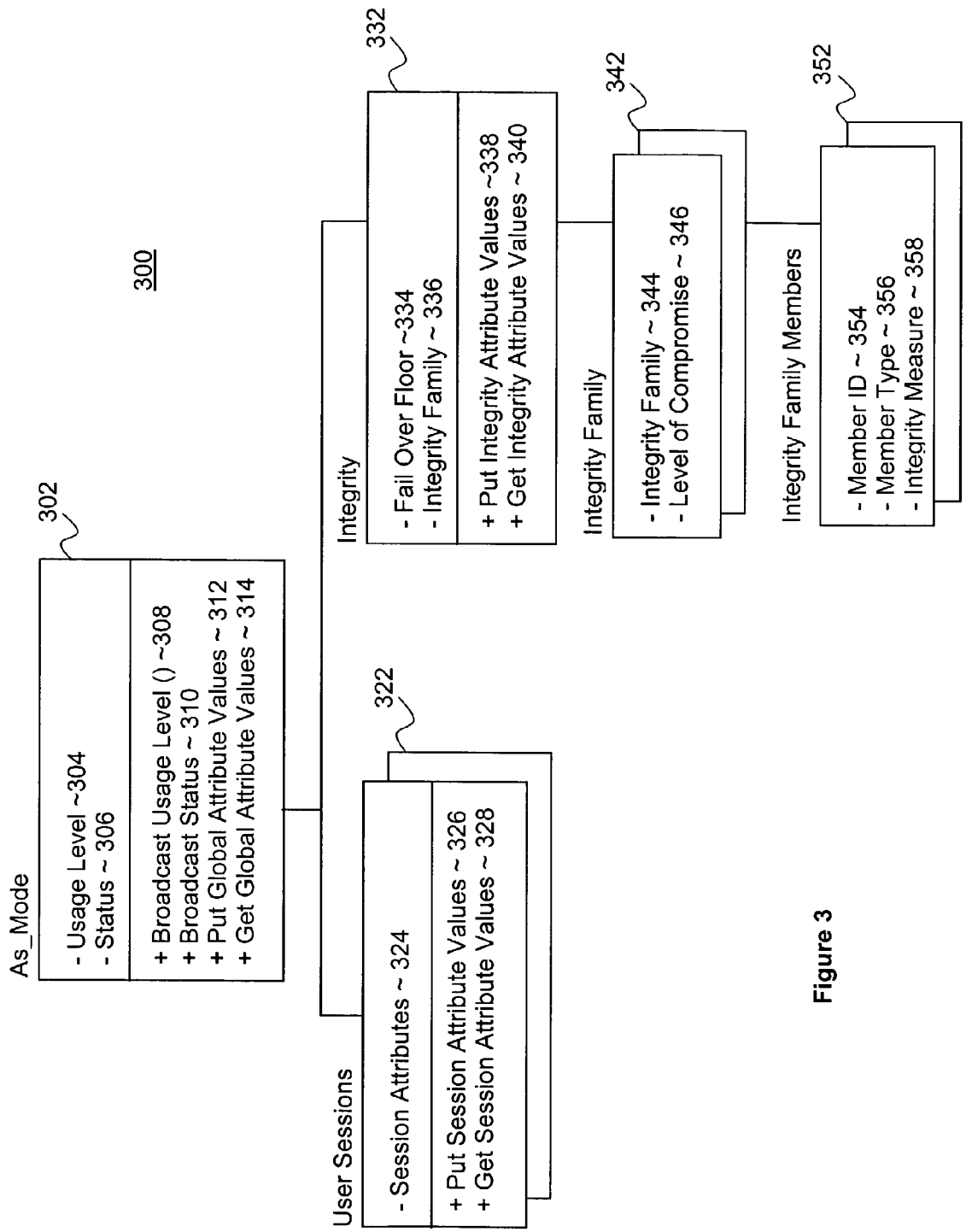
FIG. 3 illustrates an example data structure suitable for use to practice the present invention, in accordance with one embodiment.

FIG. 3 illustrates an associated data and function organization of integrity manager 130 suitable for use to practice the present invention, in accordance with one embodiment. The embodiment is an object-oriented implementation, with associated data defined as attributes of the objects, and the functions organized as inheritable methods of the objects. In alternate embodiments, other data and/or function organizations may be employed instead.

For the embodiment, object organization 300 includes a root "AS_Node" object 302 having children User Sessions objects 322 and Integrity object 332. Integrity object 332 has a number of children Integrity Family objects 344, which in turn have a number of children Integrity Family Member objects 352.

AS_Node object 302 includes in particular, Usage Level attribute 304 and Status attribute 306. As_Node object 302 further includes a number of Broadcast methods 308-310, and a number of Put/Get methods 312-314.

Usage Level attribute 304 is employed to store the current usage level of the particular AS 104, to facilitate user session allocation among the collaborating AS 104. Usage level attribute 304 may be measured in terms of the number of active user sessions, CPU utilization, as well as other metrics. Status attribute 306 is employed to denote the current status of the particular AS 104, i.e. whether they are "in service" (i.e. ready to host client sessions), whether they are "out of service" (i.e. not in a state ready/suitable for hosting client sessions).

Broadcast methods 308-310 are employed to convey at least the usage level and status information to other AS 104. Put/Get methods 312-314 are employed to allow other components of AS 104 in accessing authorized attribute values of structure 300. Children objects may inherit Put/Get methods 312-314 for attribute values storing and retrieval, in lieu of providing particularized Put/Get methods.

User Session object 322 includes in particular Session attributes 324, and Put/Get Session Attribute methods 326-328. Session attributes 324 include conventional attributes such as client identifier, memory allocation, and so forth. Put/Get Session Attribute methods 326-328 are employed to facilitate storage and retrieval of session attribute values.

Integrity object 332 includes in particular Fail Over Floor attribute 334 and Put/Get Integrity Attribute methods 338-340. Fail Over Floor attribute 334 is employed to denote a level of compromise beyond which a compromised condition of the particular AS 104 is to be deemed as unacceptable risk, and the AS 104 should be taken out of service "immediately" without soft fail over, i.e. relocating the user sessions to one or more of the remaining AS 104. Put/Get Integrity Attribute methods 338-340 are employed to facilitate storage and retrieval of integrity related attribute values.

Each Integrity Family object 342 includes in particular Integrity Family attribute 344, and Level of Compromise 346. Integrity Family attribute 344 is employed to identify a "family" of components, from the perspective of integrity assurance. One example for organizing components of AS 104 into integrity families, for integrity assurance purpose, is organizing the components in terms of whether the components are members of the kernel of the operating system, a shared/non-shared library, whether the components have privileged access or not, and forth. That is, the components are organized into the families of "privileged kernel components of the operating system", "other privileged components of the operating system", "non-privileged components of the operating system", "privileged and non-shared library components", "privileged and shared library components", "non-privileged and non-shared library components", "non-privileged and shared library components", and so forth.

The term "privilege" as used herein refers to the "authority" of the component in performing certain operations on AS 104, e.g. whether the component may access certain registers and/or memory locations of AS 104. Typically, the delineation between "privileged" and "non-privileged" entities is operating system dependent.

In alternate embodiments, other manners of organization may be practiced instead.

Level of Compromise 346 is employed to denote a risk level, for the decision of whether soft fail over may still occur, in the event one or more component members of the integrity family are deemed to have been compromised.

Each Integrity Family Member object 352 includes in particular Member ID attribute 354, Member Type attribute 356 and Integrity Measure attribute 358. Member ID attribute 354 is employed to specifically denote or identify a component, e.g. the name of an executable, a system data, and so forth, whereas Member Type attribute 356 is employed to denote the type of the named component, i.e. whether it is an executable, a system data, and so forth. Integrity Measure attribute 358 denotes the measure to be employed to determine whether the integrity family member is to be considered compromised or not, e.g. a signature of an executable or a system data value. Signatures may be in the form of MD5, SHA-1, or other hashing values of like kind.

Implementation of the Broadcast and other enumerated Put/Get methods are well within the ability of those skilled in the art, accordingly will not be further described.

Integrity Manager

Figure 4:
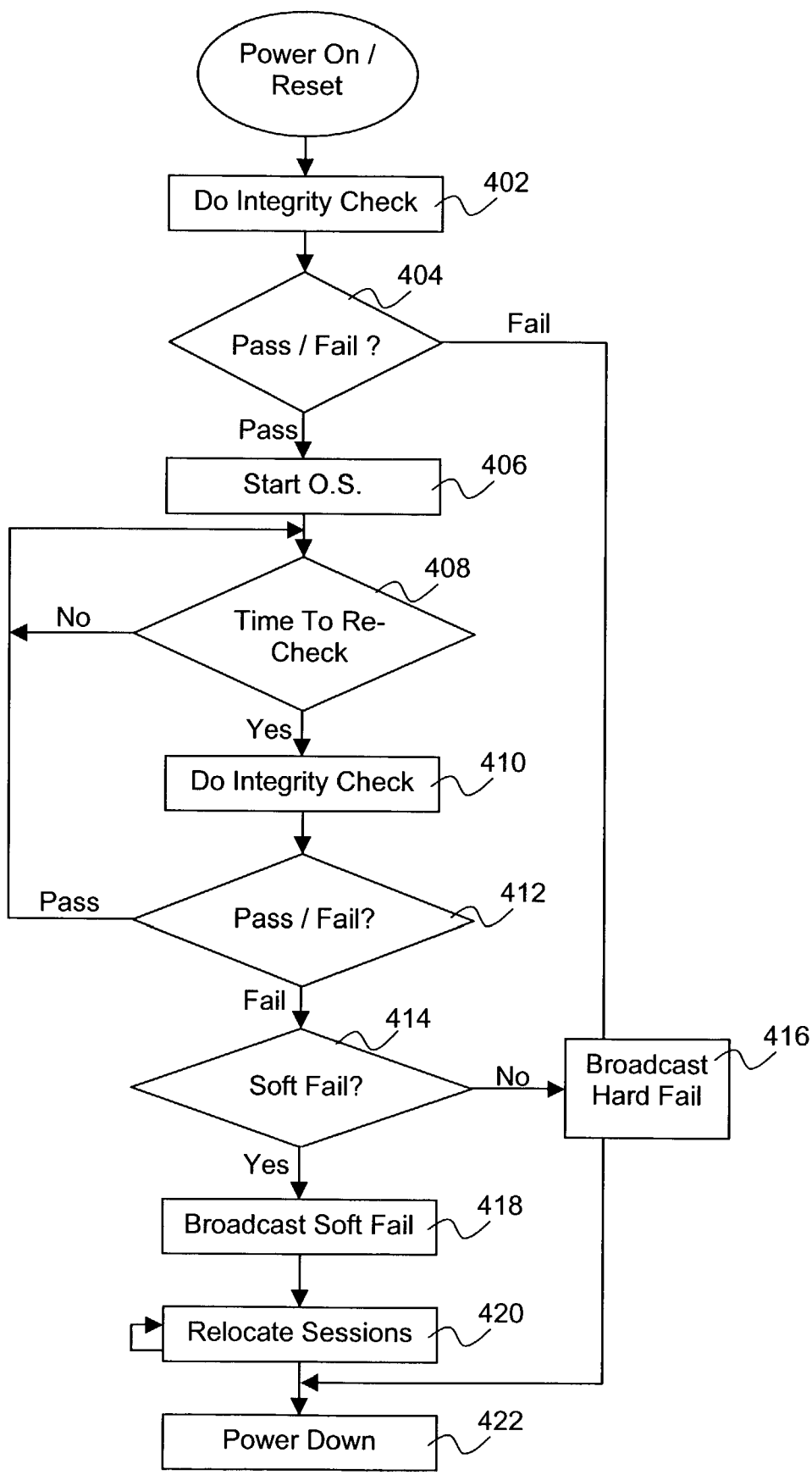
FIGS. 4-5 illustrate the operational flow of the relevant aspects of the integrity manager of FIG. 2, in accordance with one embodiment.
Figure 5:
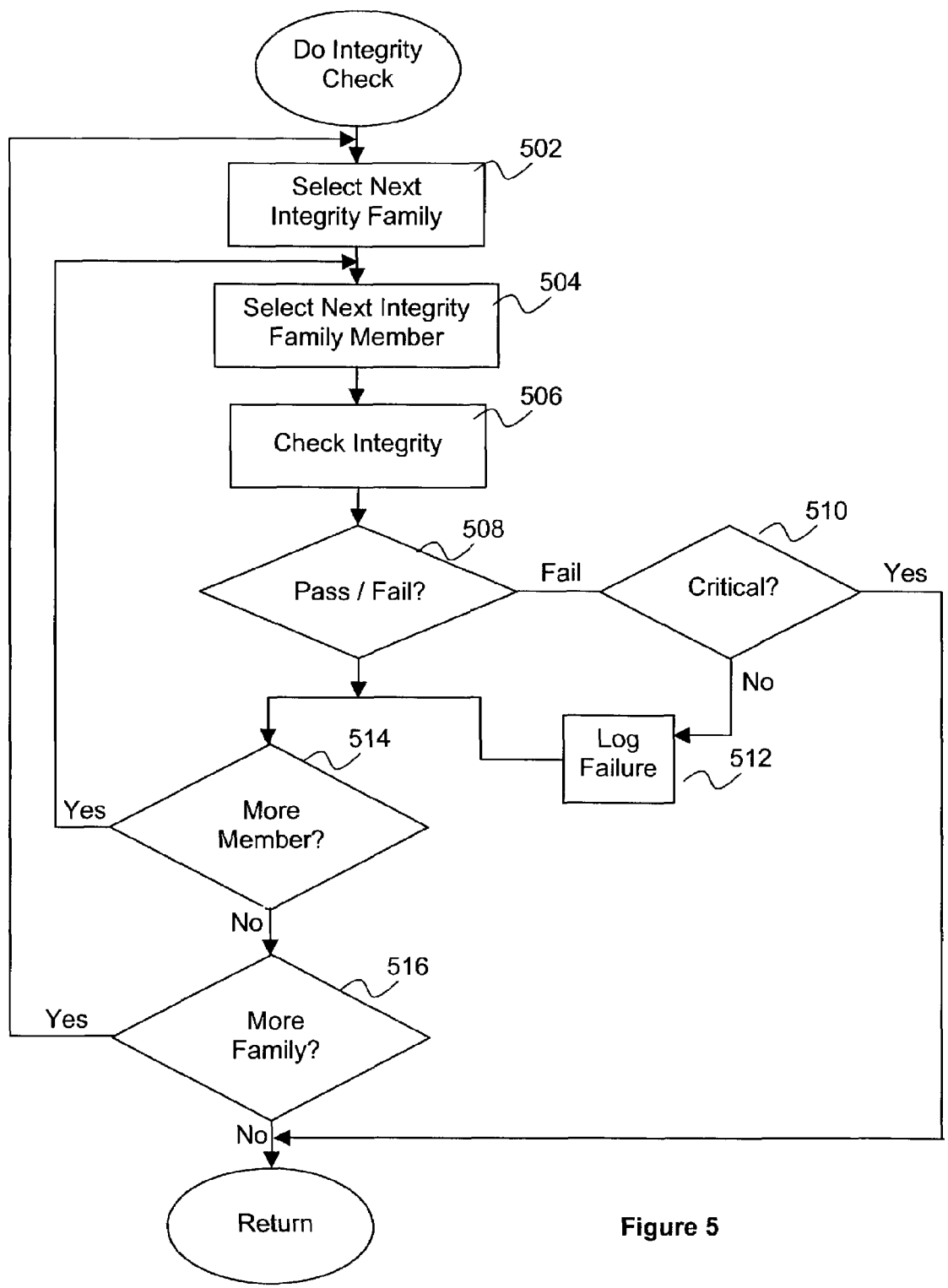

FIGS. 4-5 illustrate the operational flow of the relevant aspects of the integrity manager of FIG. 2 in further detail, in accordance with one embodiment. As illustrated, on initialization, such as power on or reset, for the embodiment, integrity manager 130 performs an integrity check on host AS 104, block 402. Preferably, integrity manager 130 is given the opportunity to perform the integrity check of block 402 at the "earliest" practical point of the initialization process, e.g. upon loading of the file system. Integrity manager 130 may be given the opportunity e.g. the boot code of operating system transferring execution control to integrity manager 130. The process of integrity check will be described more fully below, referencing FIG. 5.

Upon performing the integrity check, integrity manager 130 determines if the host AS 104 passes the integrity check or not. For the embodiment, since there is no active user sessions during initialization, integrity manager 130 applies a zero tolerance or strict compliance policy. That is, if integrity of AS 104 is not in strict conformance to the predefined expectations, integrity manger 130 proceeds to block 416, where it immediately takes AS 104 out of service and notifies other AS 104. The action may include updating Status Attribute 306, and broadcasting its status, using Broadcast method 310.

For the embodiment, from block 416, integrity manager 130 proceeds to cause the AS 104 to power down, block 422. The action may include e.g. returning execution control to the boot code of the operating system, but with an indication of the fact that a "fatal" integrity compromise condition has been detected, and the boot code is to abort the start-up process.

Back at block 404, if integrity manager 130 determines that AS 104 passes the integrity check, it returns execution control to the boot code of the operating system, with no indication of having encountered a "fatal" integrity compromise, and allows the boot code to complete the start-up process if it so chooses, block 406.

At block 408, integrity manager 130 waits for the time to re-check the integrity of the host AS 104. The action may include setting a timer and wait for the timer to expire. The wait time in between integrity checks is application dependent. As alluded to before, the wait time may be longer e.g. for intra-net applications, where likelihood of compromise is smaller, as opposed to extra-net applications, where likelihood of compromise is larger. In alternate embodiments, the integrity may be performed continuously, without wait. That is, upon completing one pass of verifying the integrity of all the components to be integrity checked (which may be a portion or all of the host AS 104, depending on the application), integrity manager 130 may immediately proceed to repeat the integrity checking process again.

In any event, if it is time to repeat the integrity check, with or without wait in between the integrity checks, integrity manager 130 proceeds to perform the integrity check, block 410. Upon performing the integrity check, integrity manager 130 again determines whether the current integrity state of the host AS 104 have passed or failed the integrity check, block 412.

If integrity manager 130 determines the current integrity state of the host AS 104 passes the integrity check, it returns to block 408, where the process continues from there as earlier described.

If integrity manager 130 determines the current integrity state of the host AS 104 fails the integrity check, i.e., host AS 104 has been compromised, it further determines whether it should allow a soft fail, block 414. The action may include determining a degree of compromise, e.g. based on the type of components compromised, privilege or unprivileged, operating system or application, shared or non-shared functions, and so forth, and whether the degree of compromise is within a level of acceptable risk, if soft fail is permitted to proceed.

If it is determined that based on the degree of compromise, the risk is too high to permit a soft fail, integrity manager 130 again proceeds to block 416 as earlier described, and causes the host AS 104 to be immediately taken out of service, and eventually powered down, block 422.

On the other hand, if it is determined that based on the degree of compromise, the risk for permitting soft fail is acceptable, integrity manager 130 proceeds to block 418, where it notifies the other AS 104 of its "soft fail" status, and cooperates with one or more of the other AS 104 to relocate the active user sessions, if any, to the one or more other AS 104, block 420.

Upon cooperatively relocating the user sessions, for the embodiment, integrity manager 130 further causes the host AS 104 to be shut down, block 422.

FIG. 5 illustrates the operational flow of the relevant part of integrity manager 130 in performing an integrity check, in further details, in accordance with one embodiment. As illustrated, integrity manager 130 first selects an integrity family to start verifying its component, e.g. the privileged kernel of the operating system, block 502. Upon selecting an integrity family, integrity manager 130 selects a member of the integrity family, block 504. The selection may be made using the earlier described data and function organization 300.

Upon selecting an integrity family member, integrity manager 130 verifies its integrity, block 506. The action may include verifying the state of an executable component conforms to an expected signature, e.g. MD5 or SHA-1, or the state of a system data conforms to an expected value, and so forth.

At block 508, integrity manager 130 determines if the component/data passes the verification check or not. If integrity manager 130 determines the component/data fails the verification check, it further determines if the failure is to be considered critical. The determination e.g. may be based on the severity of compromise associated with the component/data's integrity family, block 510.

If the failure is to be deemed as a critical failure, integrity manager 130 immediately terminates the verification process, and continues at block 404 or 412 of FIG. 4. On the other hand, if the failure is not deemed to be a critical failure, integrity manager 130 merely logs the non-critical integrity failure, block 512, and continues at block 514.

Back at block 508, if integrity manager 130 determines the component/data passes the integrity verification, it also continues at block 514.

At block 514, integrity manager 130 determines whether there are additional members of the selected integrity family remain to be verified. If so, integrity manager 130 returns to block 504, and continues from there as earlier described.

If all members of the selected integrity family have been verified, integrity manager 130 continues at block 516, and determines whether there are additional integrity families remain to be verified. If so, integrity manager 130 returns to block 502, and continues from there as earlier described.

If all integrity families have been verified, the integrity verification is completed.

Example Computer System

Figure 6:
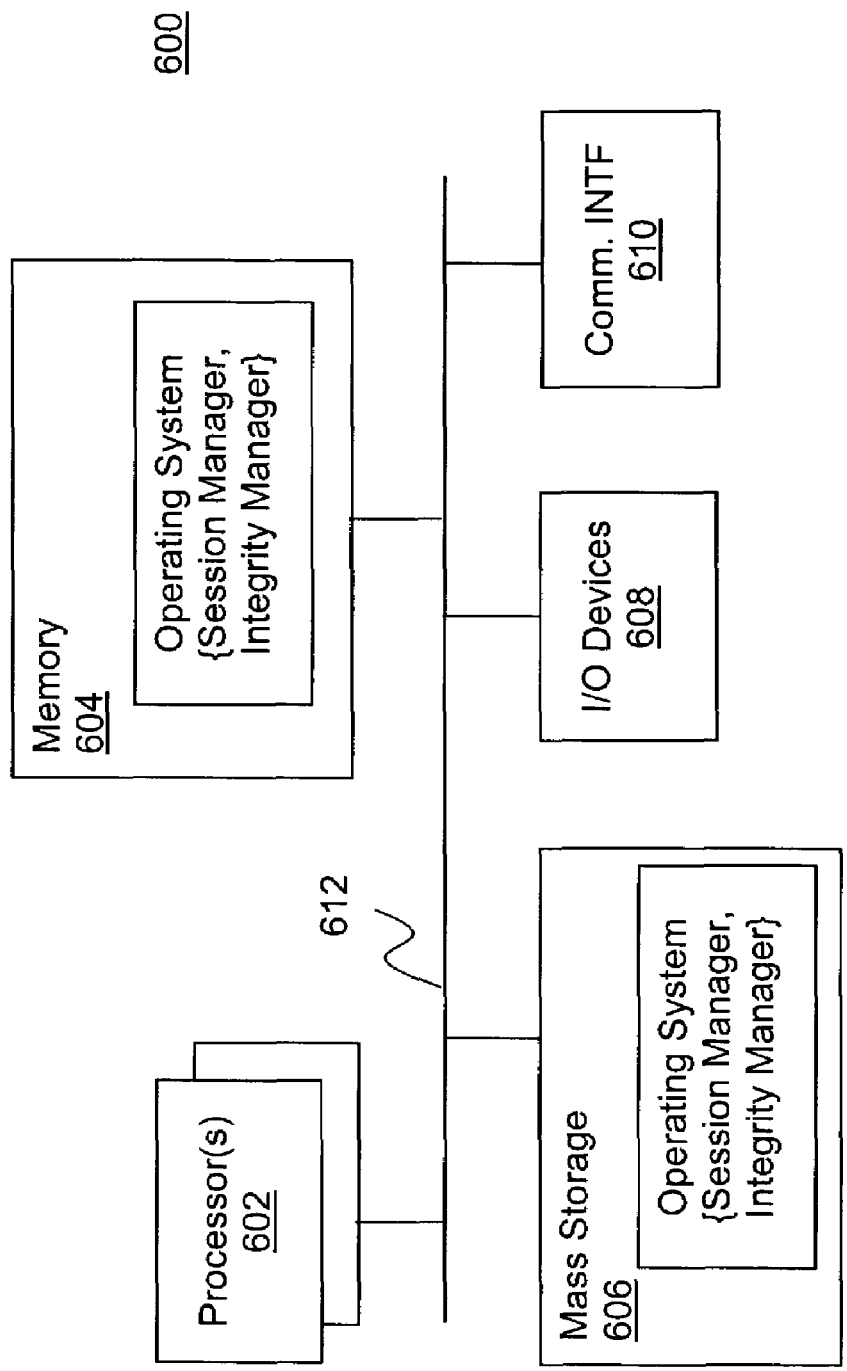
FIG. 6 illustrates an example computer system suitable for use to practice the present invention, in accordance with one embodiment.

FIG. 6 illustrates an example computer system suitable for use to practice the present invention, in accordance with one embodiment. Depending on the size, capacity or power of the various elements, example computer system 600 may be used as an AS 104 to host the applications 122 and the operating system 126, including the session manager 128 and the integrity manager 130, or as a client 112.

As shown, computer system 600 includes one or more processors 602, and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, when employed as an AS 104, system memory 604 and mass storage 606 are employed to store a working copy and a permanent copy of the programming instructions implementing the various aspects of the present invention, e.g. operating system 126 including session manager 128 and integrity manager 130. The permanent copy of the programming instructions may be loaded into mass storage 606 in the factory, or in the field, through e.g. a distribution medium (not shown) or through communication interface 610 (from a distribution server (not shown)).

The constitution of these elements 602-612 are known, and accordingly will not be further described.

CONCLUSION AND EPILOGUE

Thus, it can be seen from the above descriptions, a novel computing environment with enhanced computing integrity, including apparatuses and methods employed or practiced therein has been described.

While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In a computing environment having a plurality of computing units, a method of operation comprising:
   determining whether integrity of a first of the computing units of the computing environment has been compromised;
   determining a degree of compromise of the integrity of the first computing unit with respect to a level of risk, if the integrity of the first computing unit is determined to have been compromised; and
   soft failing the first computing unit over to one or more of the other computing units, including transferring any active user sessions to the one or more of the other computing units, if the degree of compromise of the integrity of the first computing unit is determined to be below a predetermined threshold with respect to the level of risk.

2. The method of claim 1, wherein said determining of whether integrity of a first of the computing units of the computing environment has been compromised is performed regularly on a periodic basis.

3. The method of claim 1, wherein said determining of whether integrity of a first of the computing units of the computing environment has been compromised is performed continuously.

4. The method of claim 1, wherein said determining of whether integrity of a first of the computing units of the computing environment has been compromised comprises verifying a privileged kernel of an operating system of the first computing unit has not been compromised.

5. The method of claim 1, wherein said determining of whether integrity of a first of the computing units of the computing environment has been compromised further comprises verifying other privileged software of the first computing unit has not been compromised.

6. The method of claim 5, wherein said determining of whether integrity of a first of the computing units of the computing environment has been compromised further comprises verifying shared non-privileged software of the first computing unit has not been compromised.

7. The method of claim 6, wherein said determining of whether integrity of a first of the computing units of the computing environment has been compromised further comprises verifying non-shared and non-privileged software of the first computing unit has not been compromised.

8. The method of claim 1, wherein said determining of whether integrity of a first of the computing units of the computing environment has been compromised comprises verifying certain designated system data of the first computing unit has not been compromised.

9. The method of claim 1, wherein said determining of a degree of compromise comprises determining whether any software of the first computing unit with an integrity classification greater than a predetermined level has been compromised.

10. The method of claim 1, wherein said failing of the first computing unit over to one or more of the other computing units comprises automatically relocating one or more user sessions being hosted on the first computing unit to one or more of the other computing units.

11. The method of claim 10, wherein said failing over further comprises automatically taking the first computing unit out of service, upon relocating the one or more user sessions being hosted by the first computing unit to one or more of the other computing units.

12. The method of claim 1, wherein the method further comprises automatically taking the first computing unit out of service.

13. A computing apparatus comprising:
storage medium having stored therein a plurality of programming instructions designed to
determine whether integrity of the computing apparatus has been compromised;
determine a degree of compromise with respect to the integrity of the computing apparatus with respect to a level of risk, if it is determined that the integrity of the computing apparatus has been compromised; and
automatically soft failing the computing apparatus over to one or more of companion computing apparatuses. including transferring any active user sessions to the one or more of companion computing appratuses, if the degree of compromise with respect to the integrity of the first computing unit is determined to be below a predetermined threshold with respect to the level of risk; and
a processor coupled to the storage medium to execute the programming instructions.

14. The computing apparatus of claim 13, wherein said programming instructions are executed to perform said determining of whether integrity of the computing apparatus has been compromised regularly, on a periodic basis.

15. The computing apparatus of claim 13, wherein said programming instructions are executed to perform said determining of whether integrity of a first of the computing units of the computing has been compromised continuously.

16. The computing apparatus of claim 14, wherein said programming instructions are executed to perform said determining of whether integrity of the computing apparatus has been compromised by verifying a privileged kernel of an operating system of the computing apparatus has not been compromised.

17. The computing apparatus of claim 16, wherein said programming instructions are further executed to perform said determining of whether integrity of the computing apparatus has been compromised by verifying other non-operating system kernel privileged software of the computing apparatus has not been compromised.

18. The computing apparatus of claim 17, wherein said programming instructions are designed to further perform said determining of whether integrity of the computing apparatus has been compromised by verifying shared non-privileged software has not been compromised.

19. The computing apparatus of claim 18, wherein said programming instructions are designed to further perform said determining of whether integrity of the computing apparatus has been compromised by verifying other non-shared and non-privileged software has not been compromised.

20. The computing apparatus of claim 13, wherein said programming instructions are designed to perform said determining of whether integrity of the computing apparatus has been compromised by verifying certain designated system data of the computing apparatus has not been compromised.

21. The computing apparatus of claim 13, wherein said programming instructions are designed to perform said determining of a degree of compromise by determining whether any software of the computing apparatus with an integrity classification greater than a predetermined level has been compromised.

22. The computing apparatus of claim 13, wherein said programming instructions are designed to perform said failing of the computing apparatus over to one or more of companion computing apparatuses by automatically relocating one or more user sessions being hosted on the computing apparatus to the one or more companion computing apparatuses.

23. The computing apparatus of claim 22, wherein said programming instructions are designed to perform said failing over by further automatically taking the computing apparatus out of service, upon relocating the one or more user sessions being hosted by the computing apparatus to the one or more companion computing apparatuses.

24. The computing apparatus of claim 13, wherein the programming instructions are further designed to automatically take the computing apparatus out of service.

25. An apparatus comprising:
means for determining whether integrity of the apparatus has been compromised;
means for determining a degree of compromise with respect to the integrity of the apparatus with respect to a level of risk, if it is determined that the integrity of the apparatus has been compromised, and
means for soft failing the apparatus over to one or more companion apparatuses, including transferring any active user sessions to the one or more companion apparatuses, if the degree of compromise with respect to the integrity of the apparatus is determined to be below a predetermined threshold with respect to the level of risk.

26. A computing environment, comprising:
a first computing unit equipped to regularly determine whether its integrity has been compromised, and upon determining its integrity has been compromised, determine a degree of compromise with respect to a level of risk, and soft failing it self over to at least a second computing unit, including transferring any active user sessions to the at least a second computing unit, if the degree of compromise is determined to be below a predetermined threshold with respect to the level of risk; and
the second computing unit, with the second computing unit being also equipped to regularly determine whether its integrity has been compromised, and upon determining its integrity has been compromised with respect to a level of risk, determine a degree of compromise, and soft failing itself over to at least the first computing unit, including transferring any active user sessions to the at least the first computing unit, if the degree of compromise is determined to be below a predetermined threshold with respect to the level of risk.

* * * * *